(12) United States Patent
Cohen

(10) Patent No.: US 7,321,309 B2
(45) Date of Patent: Jan. 22, 2008

(54) SYSTEM FOR DELIVERING PAIN WITHOUT CAUSING PHYSIOLOGICAL DAMAGE

(75) Inventor: Jason Cohen, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 295 days.

(21) Appl. No.: 11/114,528

(22) Filed: Apr. 26, 2005

(65) Prior Publication Data

US 2006/0238359 A1    Oct. 26, 2006

(51) Int. Cl.
*G08B 23/00* (2006.01)

(52) U.S. Cl. .............. 340/573.1; 340/407.1; 340/691.5; 340/692

(58) Field of Classification Search ......... 340/573.1, 340/691.1, 691.4, 691.5, 692, 407.1, 815.4, 340/562; 600/557; 606/27; 607/96, 108, 607/111
See application file for complete search history.

(56) References Cited

U.S. PATENT DOCUMENTS

| | | | |
|---|---|---|---|
| 3,141,602 A | | 7/1964 | Anderson |
| 3,370,630 A | | 2/1968 | Haugh |
| 3,653,585 A | | 4/1972 | Kazaros |
| 4,130,104 A | * | 12/1978 | Kristen et al. ............. 126/39 J |
| 4,381,058 A | | 4/1983 | Chaussadas et al. |
| 4,696,050 A | | 9/1987 | Sengewald |
| 4,878,764 A | | 11/1989 | Meyer |
| 4,966,286 A | | 10/1990 | Muckenfuhs |
| 5,036,978 A | | 8/1991 | Frank et al. |
| 5,048,687 A | | 9/1991 | Suzuki et al. |
| 5,067,612 A | | 11/1991 | Tsuchiya et al. |
| 5,163,558 A | | 11/1992 | Palumbo et al. |
| 5,232,118 A | | 8/1993 | Samuel |

(Continued)

FOREIGN PATENT DOCUMENTS

| | | |
|---|---|---|
| EP | 0521833 A1 | 1/1993 |
| EP | 1156099 A2 | 11/2001 |
| JP | 10205771 A * | 8/1998 |

OTHER PUBLICATIONS

Bouhassira, D. , et al., "Investigation of the paradoxical Painful Sensation('Illusion of Pain') Produced by a Thermal Grill", *Pain*, 114(1-2), Elsevier Science Publishers,(Mar. 2005),pp. 160-167.

(Continued)

*Primary Examiner*—Thomas Mullen
(74) *Attorney, Agent, or Firm*—Schwegman, Lundberg & Woessner, P.A.

(57) ABSTRACT

The system includes a thermal grill that has several relatively warm portions which are interlaced with several relatively cold portions. When an individual contacts the thermal grill, the temperature difference between the warm and cold portions of the thermal grill causes the individual to feel pain without physiologically damaging the individual. The system may provide some indication that the thermal grill should not be contacted. The system may also provide some indication that the thermal grill has been contacted. The system may also be able to send signals that the thermal grill has been contacted to a location that is different from where the thermal grill is located. The system may also allow the temperature difference between the warm and cold portions of the thermal grill to be adjusted from a remote location such that the level of pain which is generated by thermal grill is readily modified.

29 Claims, 6 Drawing Sheets

U.S. PATENT DOCUMENTS

| | | |
|---|---|---|
| 5,282,687 A | 2/1994 | Yee |
| 5,361,905 A | 11/1994 | McQueeny et al. |
| 5,467,894 A | 11/1995 | Altonen et al. |
| 5,722,774 A | 3/1998 | Hartz |
| 5,801,617 A | 9/1998 | Langner et al. |
| 5,967,665 A | 10/1999 | MacDonald et al. |
| 6,213,645 B1 | 4/2001 | Beer |
| 6,318,555 B1 | 11/2001 | Kuske |
| 6,397,560 B1 | 6/2002 | Weder |
| 6,491,165 B2 | 12/2002 | Kuske |
| 6,561,696 B1 | 5/2003 | Rusnak et al. |
| 6,601,705 B2 | 8/2003 | Molina |
| 6,626,570 B2 | 9/2003 | Fox et al. |
| 6,681,934 B2 | 1/2004 | Kolterjohn et al. |
| 6,708,823 B2 | 3/2004 | Cottingham et al. |
| 2006/0236998 A1 * | 10/2006 | Cohen .................. 126/201 |

OTHER PUBLICATIONS

Heavner, J. E., et al., "Thermal Grill Illusion and Complex Regional Pain Syndrome Type I(Reflex Sympathetic Dystrophy)", *Medline*, 22(3), (Jun. 1997), pp. 257-259.

International Search Report and Written Opinion for corresponding application PCT/US2006/003678, mailed Jul. 4, 2006 (11 pgs).

* cited by examiner

SYSTEM FOR DELIVERING PAIN WITHOUT CAUSING PHYSIOLOGICAL DAMAGE

FIELD

Some embodiments of the invention relate to a system for delivering pain, and in particular to a system for delivering pain without causing physiological damage.

BACKGROUND

A sensation of painful heat is elicited within an individual when the individual touches interlaced warm and cold bars with their skin. The sensations of pain and temperature have been analogized to the burning sensation that accompanies touching extremely cold objects.

One of the prevailing explanations of this burning sensation is that the perception of "heat" is a fusion of sensations resulting from simultaneous activation of warm and cold sensors within the body. Modern physiological findings have confirmed the existence of separate cutaneous receptors for warm and cold. It is interesting to note that the cutaneous receptors which are associated with a cold sensation appear to be activated by low and high temperatures.

A thermal grill is a device that includes interlaced warm and cold portions which are able to cause pain to an individual without causing physiological damage when the individual touches the interlaced warm and cold portions. The relative size, shape, design, configuration, temperature and orientation of the interlaced warm and cold portions may be varied in order to adjust the level of pain that can be generated within an individual that touches the thermal grill with their skin.

A typical thermal grill is unable to provide any warning that the thermal grill should not be touched. Therefore, an individual will feel pain upon touching a thermal grill unless the individual recognizes the thermal grill and avoids touching it.

In addition, thermal grills do not typically provide any indication other than the pain that is generated within the individual touching the thermal grill that contact has actually been made with the thermal grill. As an example, if an individual is wearing gloves, or engages the thermal grill with some other device, there may be no indication that the thermal grill has been contacted.

As discussed above, the thermal grill operates effectively due to the temperature difference between the warm and cold portions of the thermal grill. One of the drawbacks with existing thermal grills is that this temperature difference can not be adjusted from remote locations.

There is a need for a system that includes a thermal grill where the system is able to provide some indication that the thermal grill should not be contacted and/or has been contacted. The system should also be able to adjust the temperature difference between the warm and cold portions of the thermal grill from a remote location.

SUMMARY OF THE INVENTION

The present invention relates to a system for delivering pain without causing physiological damage. The system includes a thermal grill that may be used to deliver pain or discomfort to an individual without causing physiological damage when the individual touches the thermal grill. The system provides some indication that the thermal grill should not be contacted and/or has been contacted. The system also allows the temperature difference between the warm and cold portions of the thermal grill to be adjusted.

In one aspect, the system includes a thermal grill that causes pain to an individual without physiologically damaging the individual when the individual touches the thermal grill. The system further includes an indicator that provides the individual with information not to touch the thermal grill before the individual touches the thermal grill. The system is able to provide a warning such that an individual is more likely to recognize the thermal grill and avoid touching the thermal grill.

In some forms of the system, that indicator may be visual indicator and/or an audible indicator. As examples, the visual indicator may be a light and the audible indicator may be a speaker that emits a verbal warning not to touch the thermal grill.

In another aspect, the system includes a thermal grill that causes pain to an individual without physiologically damaging the individual when the individual touches the thermal grill. The system further includes an indicator that is attached to the thermal grill. The indicator provides information that the individual has contacted the thermal grill. In some forms of the system, the indicator is integral with the thermal grill.

The system uses an indicator to provide some notice that the thermal grill has been contacted. The indicator in the system is able to provide another indication that contact has actually been made with the thermal grill besides the pain that is generated within an individual that touches the thermal grill with their skin.

In still another aspect, the system includes a thermal grill and a detector that is attached to the thermal grill. The thermal grill causes pain to an individual without physiologically damaging the individual when the individual touches the thermal grill. The detector generates a signal that identifies when the individual has contacted the thermal grill.

The system further includes an indicator that is connected to the detector. The indicator provides information that the individual has contacted the thermal grill upon receiving the signal from the detector.

In some forms of the system, the detector is integral with the thermal grill and the indicator is detached from the thermal grill. As an example, the thermal grill and the detector may be placed in one room and the indicator may be placed in another room.

In yet another aspect, the system includes a thermal grill and a control that sends wireless signals to the thermal grill. The thermal grill causes pain to an individual without physiologically damaging the individual when the individual touches the thermal grill. The control is adapted to adjust the level of pain that is generated within the individual that touches the thermal grill.

In some forms of the system, the control adjusts a temperature difference between a warm portion of the thermal grill and a cold portion of the thermal grill. The control may also independently adjust the temperature of the warm portions and the cold portions of the thermal grill.

The control in the system allows for easy adjustment of the temperature difference between the warm and cold portions of the thermal grill. Therefore, the level of pain which is generated by thermal grill is readily modified by using the control.

The purposes and features of the present invention will be set forth in the description that follows. Additional features of the invention may be realized and attained by the product and processes particularly pointed out in the written description and claims hereof, as well as from the appended drawings.

It is to be understood that both the foregoing general description and the following detailed description are exemplary and are intended to provide further explanation of the invention claimed. The accompanying drawings, which are incorporated in and constitute part of this specification, are included to illustrate and provide a further understanding of the invention.

BRIEF DESCRIPTION OF THE DRAWINGS

The present invention will be more fully understood, and further features will become apparent, when reference is made to the following detailed description and the accompanying drawings. The drawings are merely representative and are not intended to limit the scope of the claims. Like parts depicted in the drawings are referred to by the same reference numerals.

DEFINITION

As used herein, a "thermal grill" is a device that includes interlaced warm and cold portions where the temperature difference between the interlaced warm and cold portions causes an individual to feel pain (or discomfort) when the individual touches the thermal grill but does not cause physiological damage to the individual. It should be noted that not causing physiological damage means that the stimuli which is provided by the thermal grill can not cause injury to an individual that touches the thermal grill with their skin.

The interlaced warm and cold portions may be a variety of sizes, designs, configurations, shapes, temperatures and orientations as long as the thermal grill generates pain within an individual without physiologically damaging the individual when the individual touches the thermal grill. The relative size and shape of the interlaced warm and cold portions that form the thermal grill will depend on the applications where the thermal grill is used.

DETAILED DESCRIPTION OF THE INVENTION

The following detailed description references the accompanying drawings which show some example embodiments of the invention. These example embodiments are described in sufficient detail to enable those skilled in the art to practice the invention. It is to be understood that other embodiments may be utilized, or structural changes made, such that the detailed description should not be considered as limiting the scope of the claims.

Figure 1:
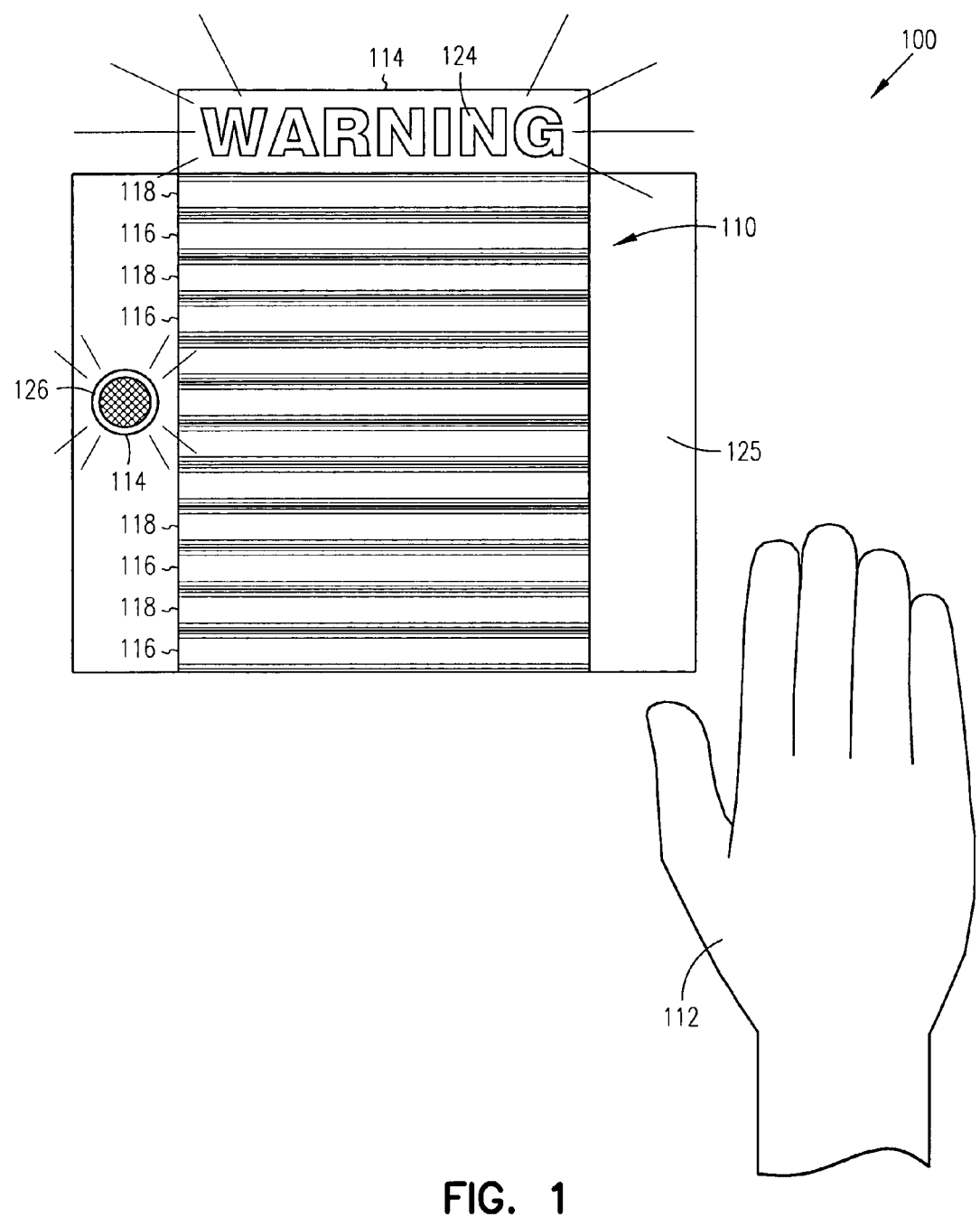
FIG. 1 illustrates a schematic perspective view of an example system for delivering pain without causing physiological damage.

FIG. 1 illustrates an example system 100 for delivering pain without causing physiological damage. The system 100 includes a thermal grill 110 that causes pain to an individual 112 without physiologically damaging the individual 112 when the individual touches the thermal grill 110. The system 100 further includes an indicator 114 (several example indicators 114 are shown in FIG. 1) that provides the individual 112 with information not to touch the thermal grill 110 before the individual 112 touches the thermal grill 110. It should be noted that the indicator 14 may be integral with the thermal grill 110 or separate from the thermal grill 110.

The thermal grill 110 is a device that has several relatively warm portions 116 which are interlaced with several relatively cold portions 118. When an individual 112 contacts the thermal grill 110 the temperature difference between the warm and cold portions 116, 118 of the thermal grill 110 causes the individual 112 to feel pain without physiologically damaging the individual 112. The relative size, shape, design, configuration, temperature and orientation of the interlaced warm and cold portions 116, 118 may be varied in order to adjust the level of pain that can be generated within an individual 112 that touches the thermal grill 110 with their skin.

As used herein, "pain" means pain, discomfort and/or unpleasant feeling. It should be noted that the thermal grill 110 may be any type of thermal grill that is known now or discovered in the future.

In some embodiments, the indicator 114 may be a visual indicator. As an example, the visual indicator 114 may be a light 124. In the example embodiment that is illustrated in FIG. 1, the light 124 provides alphanumeric information that the system 100 should not be touched.

Another example visual indicator may be that a portion 125 of the system 100 is formed of a readily observable color (e.g., bright red, bright yellow or a pattern). The readily observable color may provide the individual 112 with information that the individual 112 should not touch the thermal grill 110 before the individual 112 touches the thermal grill 110.

The visual indicator may be any type of visual indicator that is known now or discovered in the future. The type of visual indicator will depend in part on the application where the system 100 is used.

In some embodiments, the indicator 114 may be an audible indicator. As an example, the audible indicator may be a speaker 126. In the example embodiment that is illustrated in FIG. 1, the speaker 126 may be part of a siren and/or may emit a verbal warning such as "Do Not Touch" or "Stand Clear".

The audible indicator may be any type of audible indicator that is known now or discovered in the future. The type of audible indicator will depend in part on the application where the system 100 is used.

The system 100 is able to provide a warning that the thermal grill 110 should not be touched. Therefore, an individual is more likely to recognize the thermal grill 110 in the system 100 and avoid touching the thermal grill 110.

In some embodiments, the thermal grill 110 may be activated by some type of sensor (e.g., a motion sensor) that detects the presence of a person (or object) that is in the vicinity of the system 100. The ability to leave the system 100 in an "off" or "rest" mode when there is no need to activate the thermal grill 110 may save on the power that is required to operate the system 100.

Figure 2:
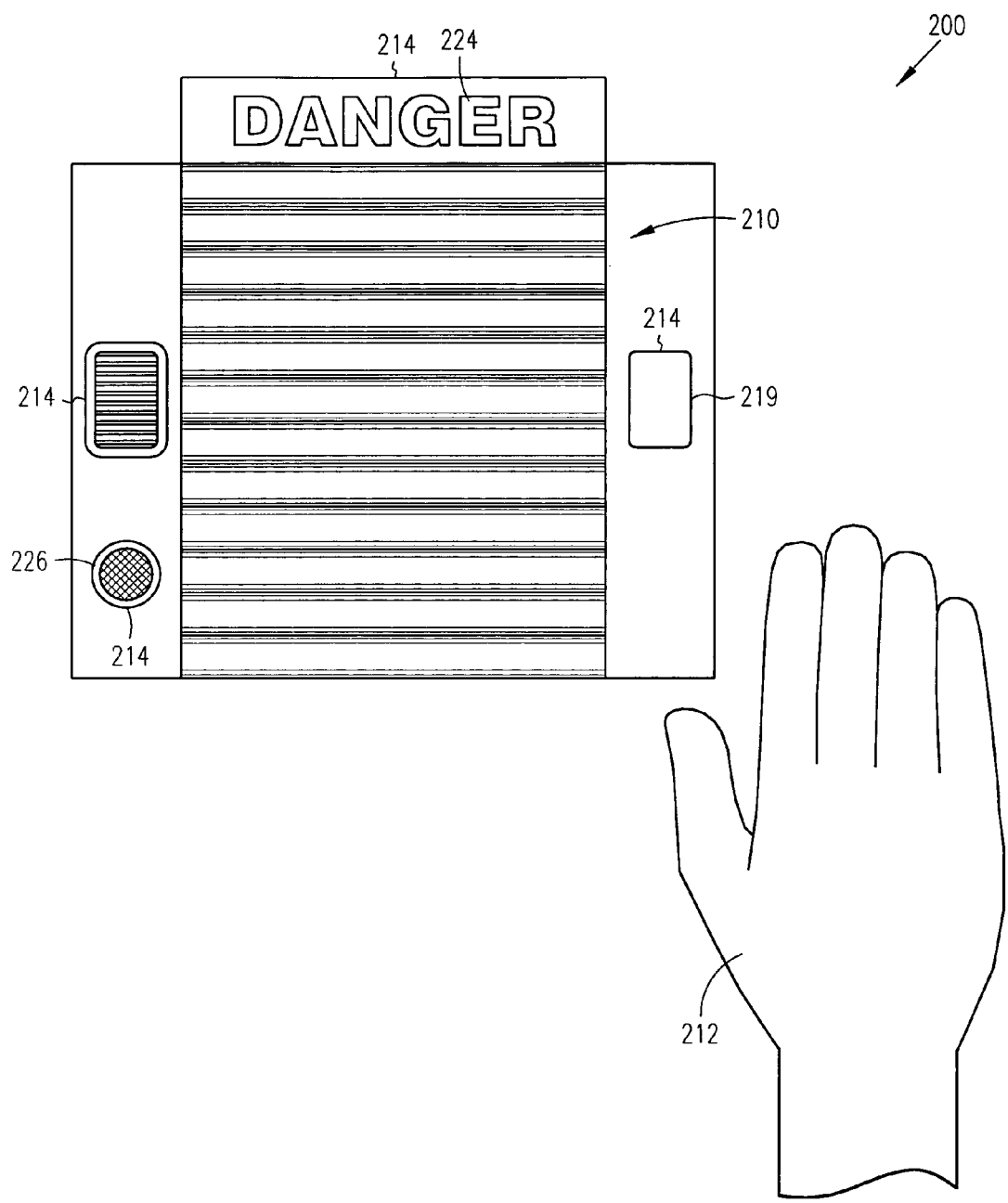
FIG. 2 illustrates a schematic perspective view of another example system for delivering pain without causing physiological damage.
Figure 3:
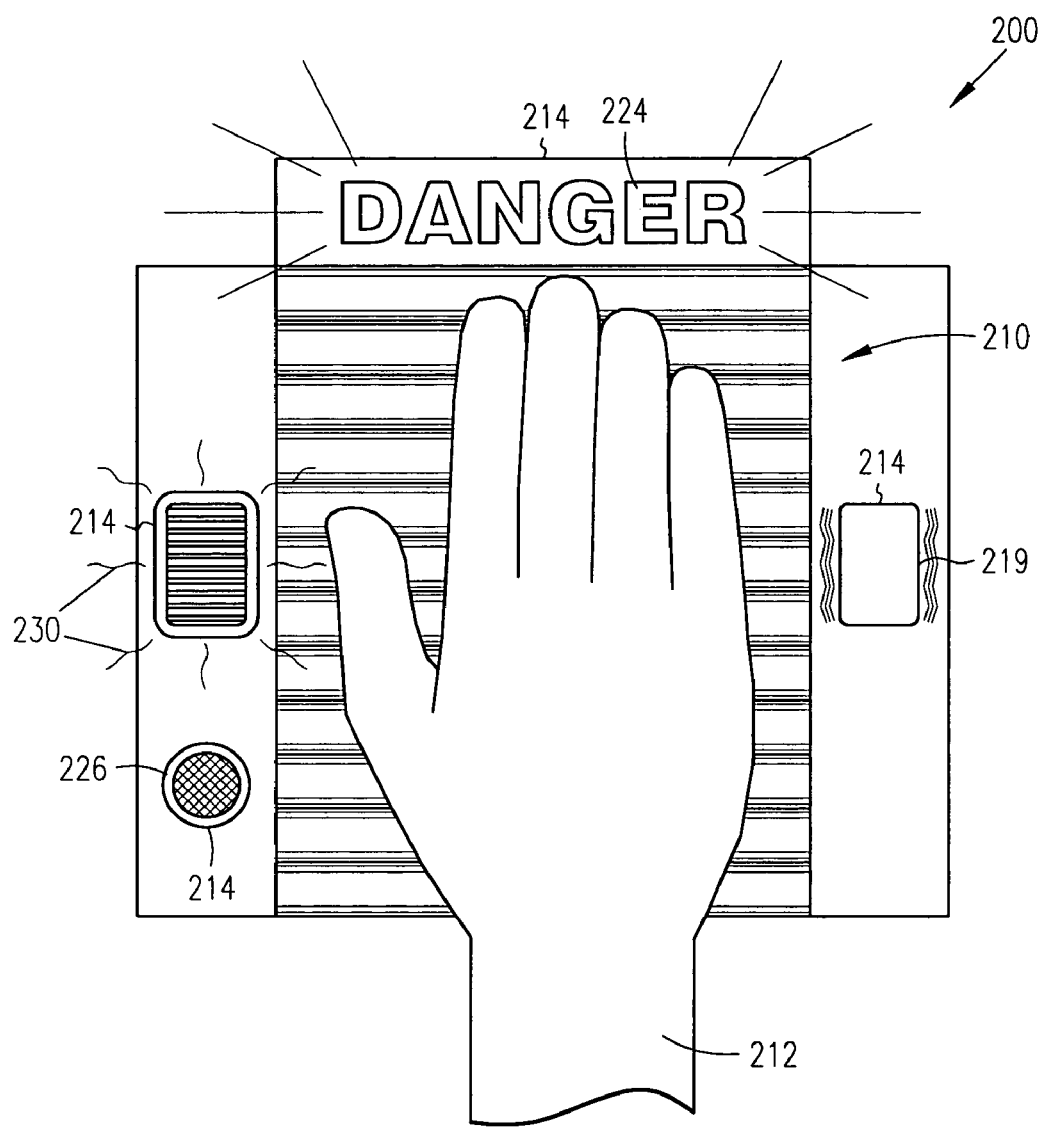
FIG. 3 illustrates the system of FIG. 2 showing a hand engaged with the system.

FIGS. 2 and 3 illustrate another example system 200 for delivering pain without causing physiological damage. The system 200 includes a thermal grill 210 that causes pain to an individual 212 without physiologically damaging the individual 212 when the individual 212 touches the thermal grill 210 (see FIG. 3).

The system 200 further includes an indicator 214 (several example indicators 214 are shown in FIGS. 2 and 3) that is attached to the thermal grill 210. The indicator 214 provides the individual 212 with information that the individual 212 has contacted the thermal grill 210.

It should be noted that the indicator 214 may be integral with the thermal grill 210 or separate from the thermal grill 210. The thermal grill 210 may be similar to the thermal grill 110 described above.

In some embodiments, the indicator 214 may be a visual indicator. As an example, the visual indicator may be a light 224. In the example embodiment that is illustrated in FIG. 2 and 3, the light 224 provides alphanumeric information that the system 200 has been contacted (see FIG. 3).

The visual indicator may be any type of visual indicator that is known now or discovered in the future. The type of visual indicator will depend in part on the application where the system 200 is used.

In some embodiments, the indicator 214 may be an audible indicator. As an example, the audible indicator may be a speaker 226. In the example embodiment that is illustrated in FIGS. 2 and 3, the speaker 226 may be part of a siren and/or emit a verbal warning such as "Avoid Contact" or "Stay Away".

The audible indicator may be any type of audible indicator that is known now or discovered in the future. The type of audible indicator will depend in part on the application where the system 200 is used.

In some embodiments, the indicator 214 may emit an aroma 230 (see FIG. 3) when the individual has contacted the thermal grill 210. The aroma 230 may be any type of aroma that signals to the individual 212 that the individual has performed an unwanted action by touching the thermal grill 210. As an example, the indicator 214 may emit an aroma 230 that is indicative of something burning. The type of aroma that is emitted will depend in part on the application where the system 200 is used.

The indicator 214 may also provide a mechanoreceptive stimuli. As an example, the indicator 214 may includes a vibrating mechanism 219 that provides the mechanoreceptive stimuli. The type of vibrating mechanism and/or mechanoreceptive stimuli that is generated by the system 200 will depend in part on the application where the system 200 is used.

The indicator 214 in the system 200 is able to provide another indication that contact has actually been made with the thermal grill 210 besides the pain that is generated within the individual 212 that touches the thermal grill 210 with their skin. Therefore, if the individual 212 is wearing gloves (not shown), or engages the thermal grill 210 with some other device (not shown), the system 200 is still able to provide some indication to the individual 212 that the thermal grill 210 has been undesirably contacted.

Figure 4:
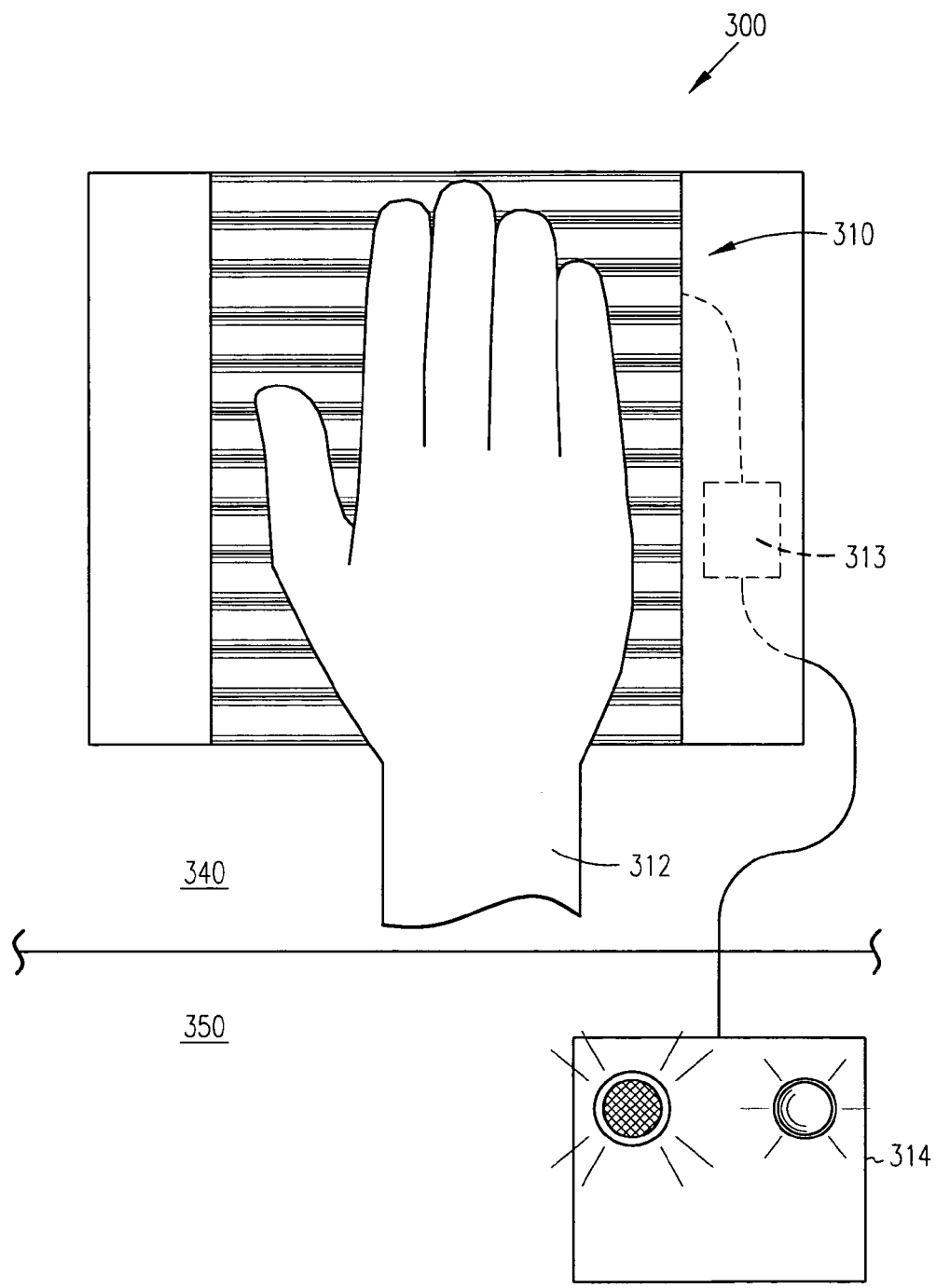
FIG. 4 illustrates a schematic perspective view of another example system for delivering pain without causing physiological damage.
Figure 5:
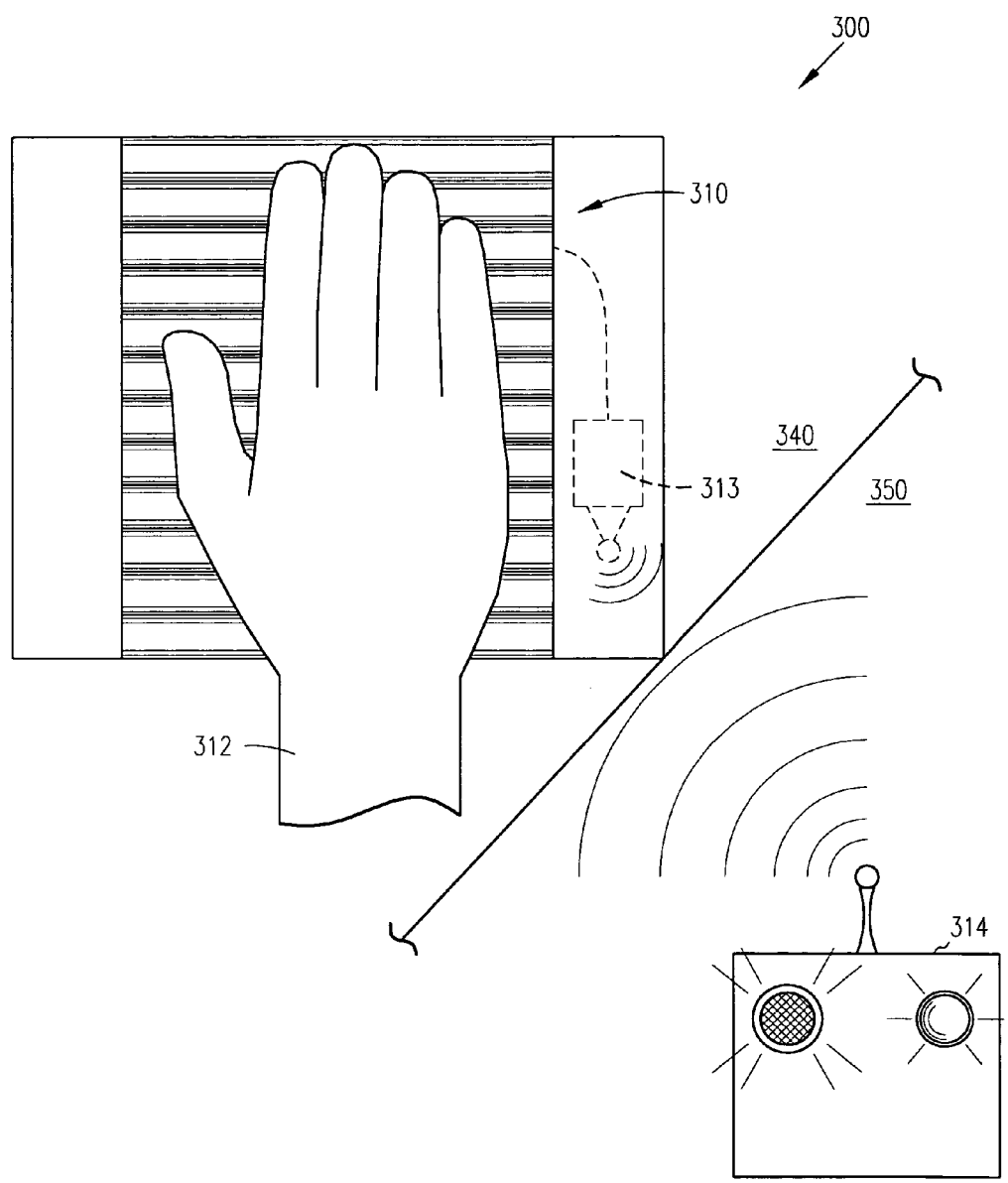
FIG. 5 illustrates the system of FIG. 4 showing airborne signals being sent between the detector and the indicator.

FIGS. 4 and 5 illustrate another example system 300 for delivering pain without causing physiological damage. The system 300 includes a thermal grill 310 that causes pain to an individual 312 without physiologically damaging the individual 312 when the individual 312 touches the thermal grill 310. The thermal grill 310 may be similar to the thermal grills 110, 210 described above.

The system 300 further includes a detector 313 that is attached to the thermal grill 310. The detector 313 generates a signal that identifies when the individual 312 has contacted the thermal grill 310. It should be noted that the detector may also generate a signal when the individual 312 is about to contact the thermal grill 310. The detector 313 may be any type of detector or sensor that is known now or discovered in the future. The type of detector 313 will depend in part on the application where the system 300 is used.

The system 300 further includes an indicator 314 that is connected to detector 313. The indicator 314 provides information that the individual 312 has contacted the thermal grill 312 upon receiving the signal from the detector 313. The indicator 314 may be similar to any of the indicators 114, 214 described above. The type of indicator will depend in part on the application where the system 300 is used.

In the example embodiment that is illustrated in FIGS. 4 and 5, the detector 313 is integral with the thermal grill 310 and the indicator 314 is detached from the thermal grill 310. As an example, the thermal grill 310 and the detector 313 may be adapted to be placed in one room 340 and the indicator may be adapted to be placed in another room 350.

A comparison of FIGS. 4 and 5 shows that the detector 313 may be hardwired to the indicator 314 (FIG. 4), or be able to send airborne signals (e.g., radiofrequency identification signals) to the indicator 314 (FIG. 5). The type of signals that are sent from the detector 313 to the indicator 314 will depend in part on the application where the system 300 is used.

The system 300 is able to provide signals that the thermal grill 310 has been contacted to a location that is different from where the thermal grill 310 is located. Therefore, someone in one room 350 may be able to monitor when an individual 312 has contacted the thermal grill 310 in another room 340.

Figure 6:
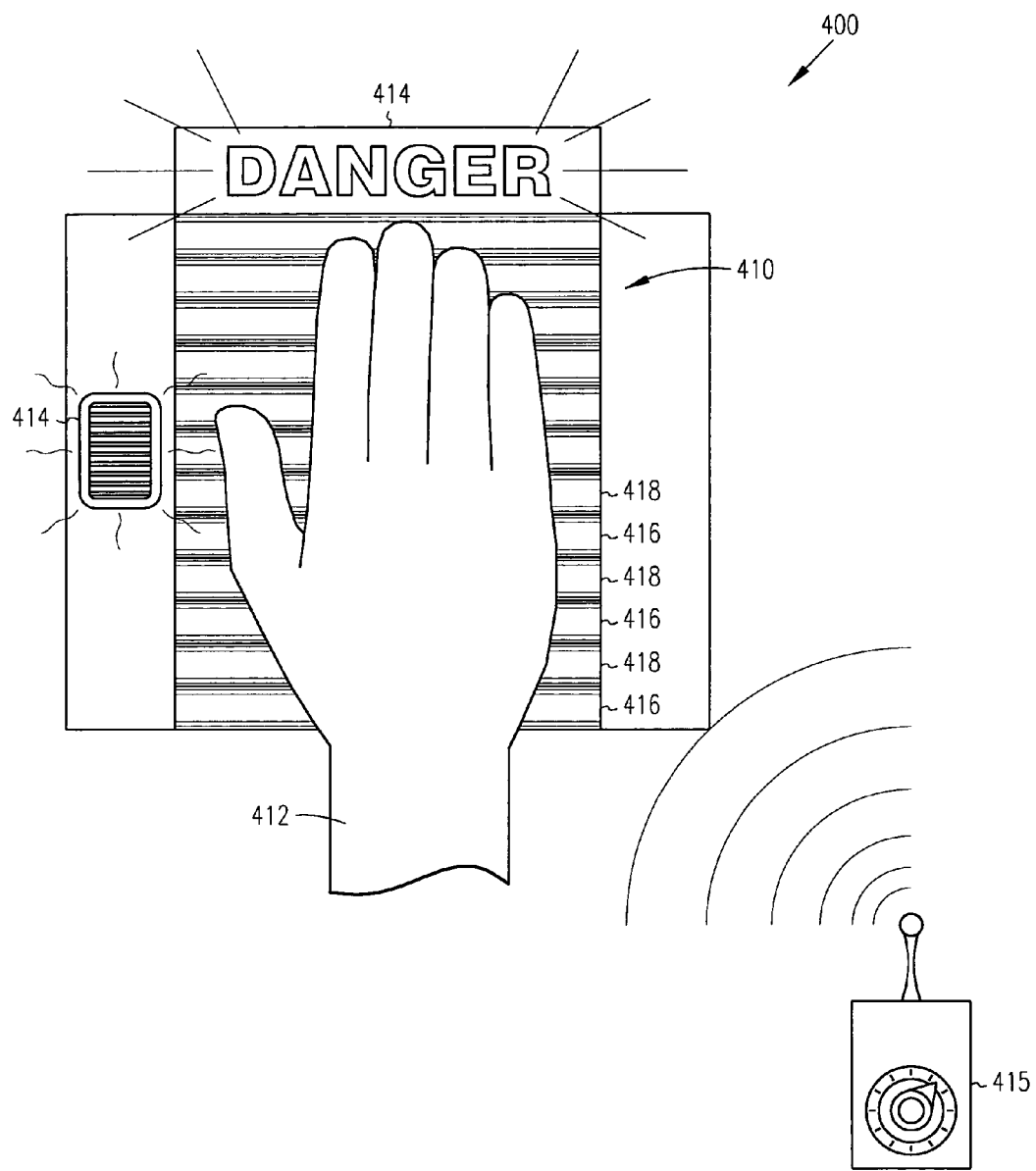
FIG. 6 illustrates a schematic perspective view of another example system for delivering pain without causing physiological damage.

FIG. 6 illustrates another example system 400 for delivering pain without causing physiological damage. The system 400 includes a thermal grill 410 that causes pain to an individual 412 without physiologically damaging the individual 412 when the individual 412 touches the thermal grill 410. The thermal grill 410 may be similar to the thermal grills 110, 210, 310 described above.

The system 400 further includes a control 415 that sends wireless signals to the thermal grill 410. The control 415 is adapted to adjust the level of pain that is generated within the individual 412 that touches the thermal grill 410.

In some embodiments, the control 415 adjusts a temperature difference between one or more warm portions 416 of the thermal grill and one or more cold portions 418 of the thermal grill 410. It should be noted that the control 415 may also independently adjust the temperature of the warm portions 416 and the cold portions 418 of the thermal grill 410.

The control 415 may be any type of control 415 that is known now or discovered in the future. The type of control 415 will depend in part on the application where the system 400 is used.

The system 400 may further include one or more indicators 414 that provide the individual 412 with information that the individual 412 (i) should not touch the thermal grill 410 before the individual 412 touches the thermal grill 410; and/or (ii) has undesirably contacted the thermal grill 410. The indicators 414 may be similar to any of the indicators 114, 214, 314 described above. The type of indicator will depend in part on the application where the system 400 is used. The type of wireless signals that are sent from the control 415 to the thermal grill 410 will depend in part on the application where the system 400 is used.

The system 400 operates effectively due to the temperature difference between the warm and cold portions 416, 418 of the thermal grill 410. The control 415 within the system 400 allows the temperature difference between the warm and cold portions 416, 418 to be readily adjusted. Therefore, the level of pain which is generated by thermal grill 410 may be modified by using the control 415.

It should be noted that the number and type of thermal grills, indicators, detectors and controls within the system may vary as long as the needs of particular applications are considered. In addition, although FIGS. 1-6 illustrate a hand engaging a thermal grill, it should be apparent that other parts of a human (or animal) body (e.g., feet, back, head) may engage the thermal grill.

FIGS. 1-6 are representational and are not necessarily drawn to scale. Certain proportions thereof may be exaggerated, while others may be minimized.

The systems described herein include a thermal grill where the system is able to provide some indication that the thermal grill should not be contacted and/or has been contacted. The systems may also make it easier to adjust the temperature difference between the warm and cold portions of the thermal grill.

While the invention has been described in detail with respect to the specific aspects thereof, it will be appreciated that those skilled in the art, upon attaining an understanding of the foregoing, may readily conceive of alterations to, variations of, and equivalents to these aspects which fall within the spirit and scope of the present invention, which should be assessed accordingly to that of the appended claims.

I claim:

1. A system which is capable of delivering pain without causing physiological damage, the system comprising:
   a thermal grill that causes pain to an individual without physiologically damaging the individual when the individual touches the thermal grill; and
   an indicator that provides the individual with information not to touch the thermal grill as the individual approaches the thermal grill.

2. The system of claim 1 wherein the indicator is integral with the thermal grill.

3. The system of claim 1 wherein the indicator is a visual indicator.

4. The system of claim 3 wherein the visual indicator is a light.

5. The system of claim 3 wherein the visual indicator includes alphanumeric information.

6. The system of claim 3 wherein the visual indicator includes a readily observable color.

7. The system of claim 1 wherein the indicator is an audible indicator.

8. The system of claim 7 wherein the audible indicator includes a siren.

9. The system of claim 7 wherein the audible indicator includes a verbal warning.

10. A system for delivering pain without causing physiological damage, the system comprising:
    a thermal grill that causes pain to an individual without physiologically damaging the individual when the individual touches the thermal grill; and
    an indicator attached to the thermal grill, the indicator providing the individual with information that the individual has contacted the thermal grill.

11. The system of claim 10 wherein the indicator is integral with the thermal grill.

12. The system of claim 10 wherein the indicator is a visual indicator that may be seen by the individual when the individual has contacted the thermal grill.

13. The system of claim 12 wherein the visual indicator is a light.

14. The system of claim 12 wherein the visual indicator includes alphanumeric information.

15. The system of claim 10 wherein the indicator is an audible indicator that may be heard by the individual when the individual has contacted the thermal grill.

16. The system of claim 15 wherein the audible indicator is a siren.

17. The system of claim 15 wherein the audible indicator includes a verbal warning.

18. The system of claim 10 wherein the indicator emits an aroma when the individual has contacted the thermal grill.

19. The system of claim 10 wherein the indicator provides a mechanoreceptive stimuli.

20. The system of claim 19 wherein the indicator includes a vibrating mechanism which provides the mechanoreceptive stimuli.

21. A system for delivering pain without causing physiological damage, the system comprising:
    a thermal grill that causes pain to an individual without physiologically damaging the individual when the individual touches the thermal grill;
    a detector attached to the thermal grill, the detector generating a signal that identifies when the individual has contacted the thermal grill; and
    an indicator connected to the detector, the indicator providing information that the individual has contacted the thermal grill upon receiving the signal from the detector.

22. The system of claim 21 wherein the detector is hardwired to the indicator.

23. The system of claim 21 wherein the detector sends airborne signals to the indicator.

24. The system of claim 21 wherein the detector sends radiofrequency identification signals to the indicator.

25. The system of claim 21 wherein the indicator includes a visual indicator.

26. The system of claim 21 wherein the detector is integral with the thermal grill and the indicator is detached from the thermal grill.

27. The system of claim 21 wherein the thermal grill and the detector are adapted to be placed in one room and the indicator is adapted to be placed in another room.

28. A system for delivering pain without causing physiological damage, the system comprising:
    a thermal grill that causes pain to an individual without physiologically damaging the individual when the individual touches the thermal grill;
    a control that sends wireless signals to the thermal grill such that the thermal grill adjusts the level of pain that is generated within the individual that touches the thermal grill based on the wireless signals; and
    an indicator attached to the thermal grill, the indicator providing the individual with information that the individual should not touch the thermal grill.

29. A system for delivering pain without causing physiological damage, the system comprising:
a thermal grill that causes pain to an individual without physiologically damaging the individual when the individual touches the thermal grill;
a control that sends wireless signals to the thermal grill such that the thermal grill adjusts the level of pain that is generated within the individual that touches the thermal grill based on the wireless signals; and
an indicator attached to the thermal grill, the indicator providing the individual with information that the individual has contacted the thermal grill.

* * * * *